UNITED STATES PATENT OFFICE.

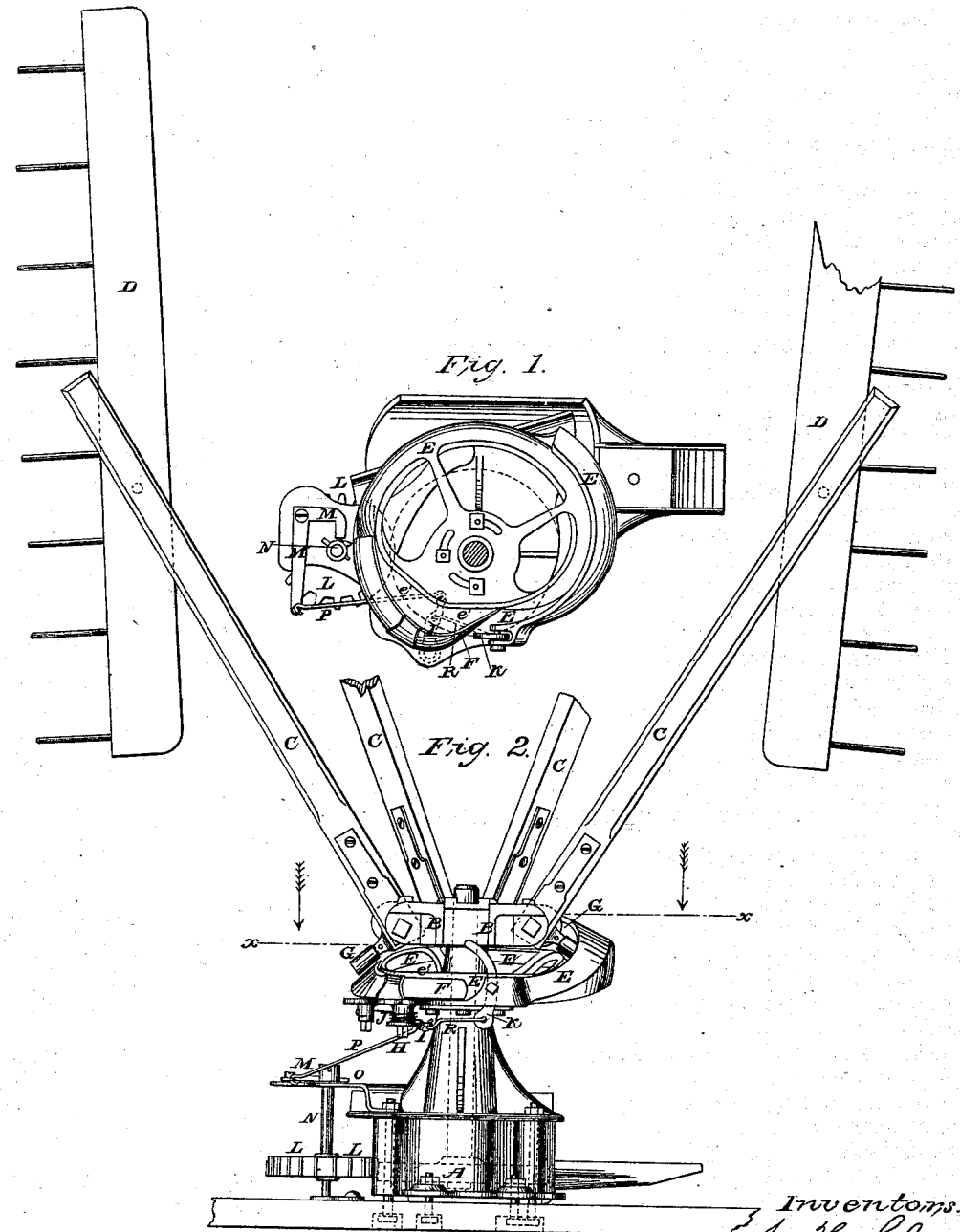

JAMES H. GLASS AND ALBERT J. GLASS, OF McGREGOR, IOWA.

IMPROVEMENT IN HARVESTER-RAKES.

Specification forming part of Letters Patent No. 72,016, dated December 10, 1867.

*To all whom it may concern:*

Be it known that we, JAMES H. GLASS and ALBERT J. GLASS, of McGregor, in the county of Clayton and State of Iowa, have invented a new and useful Improvement in Self-Raking Attachment for Reapers; and we do hereby declare that the following is a full, clear, and exact description thereof, which will enable others skilled in the art to make and use the same, reference being had to the accompanying drawings, forming part of this specification.

Figure 1 is a horizontal sectional view taken through the line $x\ x$, Fig. 2, of a part of a reaper to which our improvements have been attached, the rakes being removed. Fig. 2 is a side view of the same, showing some of the rakes in place.

Similar letters of reference indicate corresponding parts.

Our invention has for its object to furnish an improved attachment for reapers of that class in which the rakes act as beaters in the place of a reel, and are occasionally made to descend to sweep the bundle from the platform, so that the third, fourth, sixth, or any other desired rake may sweep the platform and deliver the bundle; and it consists in the combination of the cog-wheel, the teeth of which have such a ratio to the teeth of the rake-wheel as will cause the third, fourth, sixth, or any other desired rake to sweep the bundle from the platform, with the rake-wheel; and in the combination of a cam and crooked lever with the shaft of the gear-wheel, and with the arm that operates the switch to open and close it, the whole being constructed and arranged as hereinafter more fully described.

A is the rake-wheel. B is the head to which are pivoted the arms C, to which the rakes D are attached. E is the way or track by which the movements of the rake-arms C and rakes D are guided. F is the switch, which is opened to allow the guide-pin G to enter the branch track $e'$, to allow the rake to descend to the platform. The switch F is pivoted to the bottom of the track E by a pin, H, rigidly attached to said switch, and passing through the bottom of said track. To the lower end of the pin H is rigidly connected an arm, I, by means of which the switch F is opened and closed. J is a coiled spring, one end of which is attached to the arm I, and its other end to some stationary support, so as to bring the switch F back to its place as soon as the rake-arm has passed. K is a brace or supporting-lever, which is pivoted to the track E, and the lower end of which is connected to the arm I by a connecting-rod, R, or its equivalent, so that as the switch F is opened the upper end of the brace-lever K may be drawn down to support the free end of said switch. L is a gear-wheel, the shaft N of which revolves in bearings in the frame-work of the machine, and the teeth of which mesh into the teeth of the rake-wheel A.

The rake-wheel A is made with thirty teeth, and the wheel L is made with eighteen, twenty-four, thirty-six, or any other multiple of the number obtained by dividing the number of teeth in the rake-wheel A by the number of rake-arms C, according as it is desired to have every third, fourth, sixth, or any other rake sweep the platform.

M is a bent or crooked lever, which is pivoted to the frame-work of the machine, or to some other suitable support, in such a position that the end of its short arm may rest against or close to the projecting end of the shaft N of the gear-wheel L, so that the said lever may be operated by the cam O, rigidly attached to the said upper end of the said shaft N.

The long arm of the bent lever M is connected to the arm I by a connecting-rod, P, or its equivalent, so that at each revolution of the wheel L the switch F may be opened to allow a rake to sweep the platform.

We claim as new and desire to secure by Letters Patent—

1. The combination of the wheel L with the rake-wheel A and arms C, substantially as herein shown and described, and for the purpose set forth.

2. The combination of the cam O and bent or crooked lever M with the shaft N of the gear-wheel L, and with the arm I, rigidly connected with the switch F, substantially as herein shown and described, and for the purpose set forth.

JAMES H. GLASS.
ALBERT J. GLASS.

Witnesses:
W. L. CALKINS,
F. G. HANNAH.